Aug. 11, 1931.   F. E. WILSEY   1,818,595
FLUID TIGHT PACKING
Filed Feb. 13, 1928
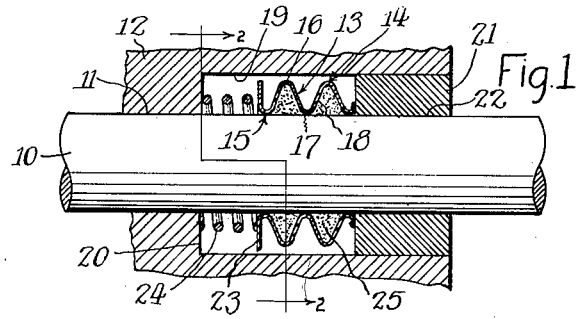
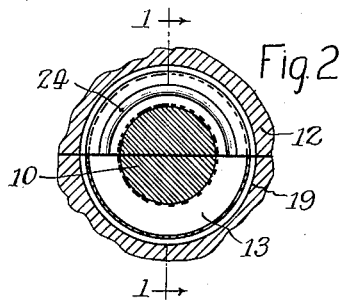
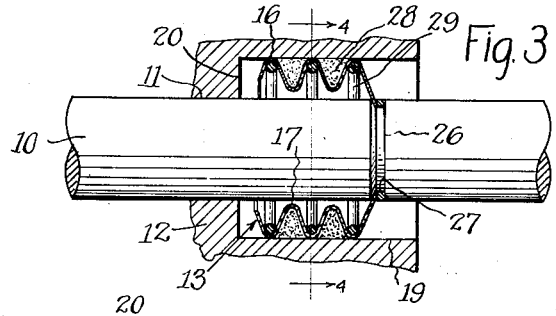
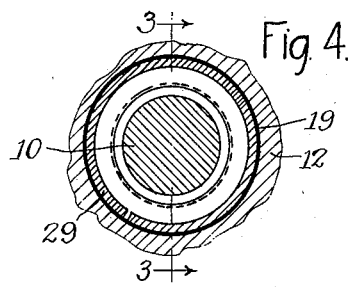
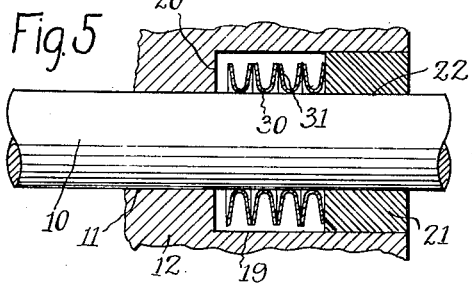
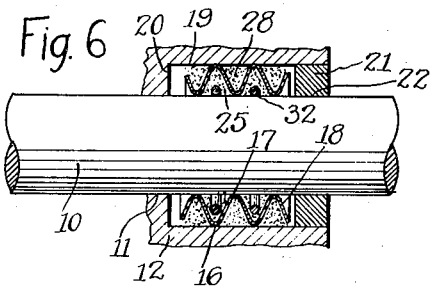
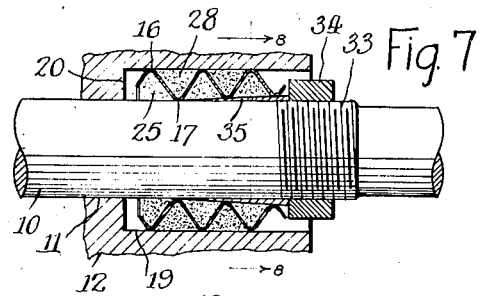
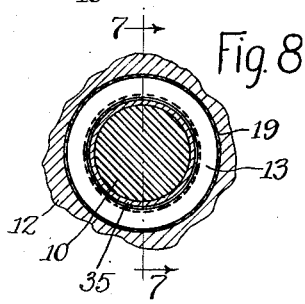
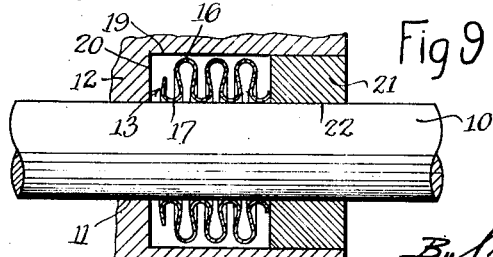
Inventor:
Frank E. Wilsey.

Patented Aug. 11, 1931

1,818,595

UNITED STATES PATENT OFFICE

FRANK E. WILSEY, OF CHICAGO, ILLINOIS

FLUID-TIGHT PACKING

Application filed February 13, 1928. Serial No. 253,822.

The present invention relates to improvements in fluid-tight packings, and has particular reference to an improved seal packing for moving or rotary parts, such as the shafts of fluid engines.

The handling of fluids, particularly fluids such as oil and steam when under a high pressure, involves the problem of preventing leakage through the bearings for the rotary or moving parts of the machine. The problem of preventing leakage is extremely important to the successful and satisfactory operation of many machines for handling high-pressure fluids, and is more difficult in some instances than in others. Heretofore a large variety of stuffings and packings have been provided, and there has been a gradual but persistent evolution of the art of packings. Thus, we first had fabric packings, then asbestos fabric combination packings, then rubber packings, then shredded metallic packings with graphite, and then metallic packing rings having lapped surfaces. The latter type of packing is believed to be the most satisfactory of those provided heretofore, but the other packings are still used to a large extent under less exacting conditions where the seal they provide is satisfactory. Packings provided heretofore are subject to numerous objections. Thus, they may be complicated and expensive, or may be subject to excessive wear so that leakage will take place in a short time, or may break down with use, or may lack resiliency so that the coacting surfaces will not conform to each other so as to effect a tight seal. The primary object of the present invention therefore resides in the provision of a new and improved packing which will provide a permanent fluid-tight seal.

Other objects and advantages of the invention reside in the provision of a novel packing comprising one or more of the following features:

1. A packing that is unusually simple and inexpensive in construction.

2. A packing that is capable of being easily and quickly assembled with the parts to be sealed, and without requiring the tightening of bolts.

3. A packing that is elastic and resilient so that a small number of standard sizes can be made to fit a large number of differently sized parts, and so that the packing is self-adjusting to take up any slight normal wear and to aline or set the lapped sealing surfaces squarely against each other.

4. A packing that is subject to a negligible degree of wear, and that requires no further adjustment after once having been installed.

5. A packing that provides a tight uniform fit for steam as well as oil and other fluids.

6. A packing that is subject to very little friction, and rapidly dissipates any heat resulting from friction.

I accomplish the above objects by providing a diaphragm or tubular bellows having one or more peripheral lapped surfaces arranged to engage a lapped surface on either, or lapped surfaces on both of the relatively moving parts of the bearing to be sealed. If the bellows has a lapped engagement only with the moving part, it is provided with a fixed fluid-tight connection with the rigid part; if the bellows has a lapped engagement only with the fixed part, it is provided with a fixed fluid-tight connection with the moving part and is movable therewith; if the bellows has a lapped engagement with both the fixed and the moving parts it is disposed freely therebetween without having a fixed fluid-tight connection with either. The bellows is deformable, i. e. an elongation thereof will result in changing the lateral dimension, and hence the bellows due to its inherent resiliency will conform to local irregularities on the part moving relatively thereto and will always tightly engage said part regardless of wear.

Still other objects reside in the provision of means adapted to replace or supplement the natural resiliency of the metal for causing the bellows to conform closely to the cooperating surfaces, and means for lubricating the lapped surfaces.

Further objects and advantages will become apparent as the description proceeds.

In the accompanying drawings, Figure 1 is a longitudinal sectional view taken along line 1—1 of Fig. 2 of a fluid-tight packing embodying the features of my invention.

Fig. 2 is a fragmentary sectional view taken along line 2—2 of Fig. 1.

Fig. 3 is a longitudinal sectional view of a modified form of the invention taken along line 3—3 of Fig. 4.

Fig. 4 is a fragmentary sectional view taken along line 4—4 of Fig. 3.

Fig. 5 is a longitudinal sectional view of a second modified form of the invention.

Fig. 6 is a longitudinal sectional view of a third modified form of the invention.

Fig. 7 is a longitudinal sectional view of a fourth modified form of the invention and taken along line 7—7 of Fig. 8.

Fig. 8 is a fragmentary sectional view taken along line 8—8 of Fig. 7.

Fig. 9 is a longitudinal sectional view of a fifth modified form of the invention.

While the invention is susceptible of various modifications and alternative constructions, I have shown in the drawings and will herein describe in detail the preferred embodiments, but it is to be understood that I do not thereby intend to limit the invention to the specific form disclosed, but intend to cover all modifications and alternative constructions falling within the spirit and scope of the invention as expressed in the appended claims.

Referring more particularly to the drawings, I have shown various forms of my invention as applied to a rotating shaft 10 having a tight rotating fit in a bore 11 in a suitable bearing 12, but it will be understood that the invention is adaptable to a large variety of relatively moving parts having coacting bearing surfaces to be sealed against the passage of fluid.

Referring first to the form of the invention shown in Figs. 1 and 2, a bellows 13 of suitable form and material is provided. Preferably, the bellows 13 comprises a cylinder corrugated longitudinally to form a plurality of peripheral inner and outer convolutions 14 and 15 respectively. In the present instance, the longitudinal cross-section of the annular convolutions 14 and 15 is sinusoidal in character, comprising crests 16 and troughs 17 joined by sides 18. One crest 16 or trough 17 with the contiguous sides comprises a unit, and the bellows may consist of any desired number of these units. Each unit in effect constitutes a diaphragm. The sides of each convolution are divergent so that elongation of the bellows will increase the minimum inside diameter and decrease the maximum outside diameter, and contraction of the bellows will have the reverse effect.

The bellows 13 is disposed about the shaft 10 in an enlarged bore 19 formed in the bearing 12 at one end of the bore 11, and open at its outer end. The inner end wall of the bore 19 constitutes an annular radial shoulder 20. A suitable bushing 21 is tightly secured in the outer end of the bore 19 to close the same, and has a bore 22 in alinement with the bore 11 and through which the shaft 10 extends. The inner surfaces of the troughs 17 are arranged to contact with the shaft 10, while the crests 16 are spaced from the periphery of the bore 19. One end of the bellows 13 has a rigid fluid-tight connection with the fixed part of the structure, and in the present instance, the outer end is secured to the bushing 21 in any suitable manner as by soldering or by being imbedded therein by pressure. The inner end of the bellows 13 is free, and preferably is formed integral with an annular radial flange 23. Mounted on the shaft 10 and abutting at its ends against the shoulder 20 and the flange 23 is a coil spring 24.

The bellows 13 may be made either of resilient or non-resilient flexible material. If the bellows 13 is non-resilient, the spring 24 will tend to compress the bellows endwise, and thereby tend to maintain the troughs 17 in contact with the shaft 10. If the bellows 13 is resilient, it is selected before assembly with a minimum internal diameter somewhat less than the diameter of the shaft 10, is then elongated so as to slip freely onto the shaft, and is then released into longitudinally spaced peripheral contacts with the shaft. The inherent resiliency of the bellows thus tends to hold the troughs 17 in contact with the shaft 10, and the spring 24 merely reinforces or assists this action.

The inner surfaces of the troughs 17 and the peripheral surface of the shaft 10 in the region of the bellows 13 are lapped, and hence will effectually seal the bearing against the passage of fluid, leaking from the bore 11 into the space 19, from said space to the bushing 21. The troughs 17 define a plurality of annular parallel spaced inner labyrinth spaces 25 about the shaft 10. These spaces are particularly useful when a condensible fluid such as steam is being handled, since they will interrupt any leak lines and will fill with any condensate that may leak thereto, thereby greatly improving the sealing action. In the present instance, a suitable lubricant, such as graphite and grease, is placed in the labyrinth spaces 25, and serves to properly lubricate the lapped surfaces.

The lapped surfaces will not wear appreciably or to an objectionable extent, and hence the bellows will provide a permanent fluid-tight seal. Either because of the inherent resiliency of the bellows 13, or because of the spring 24, or both, the bellows 13 conforms closely to the shaft 10, compensating for irregularities in the lapped surfaces, and will automatically adjust itself to take up what little wear may occur. As a result a highly efficient fluid seal is obtained, and the seal will not deteriorate or break down in use. The inner lapped surface of each trough 17 has substantially peripheral line contact with the shaft 10, and hence but a very slight amount of friction will result, and the heat generated by the slight amount of friction that may result will be rapidly dissipated by the large surface of the bellows 13.

In Figs. 3 to 9, I have shown various modified forms of the invention, and corresponding parts thereof will be designated by like character references. In each form of the invention illustrated in Figs. 1 to 9, the diaphragm or bellows has a fluid-tight connection with each of the two relatively movable parts, i. e. the shaft 10 and the bearing 12. The connection with one of the parts must comprise a fluid-tight bearing contact, and this may be with either of the parts. The connection with the other of the parts may comprise a fluid-tight bearing contact or a fixed seal.

In the modified form of the invention illustrated in Figs. 3 and 4, the bellows 13 is of the same general type as in Fig. 1, but is provided in a different size so as to arrange the outer surfaces of the crests 16 in contact with the peripheral surface of the bore 19, and the inner surfaces of the troughs 17 out of contact with the shaft 10. The outer end of the bellows 13 has a rigid fluid-tight connection with the shaft 10, and in the present instance is secured in an annular notch 26 in the shaft 10 by means of a ring 27 wedged therein. To provide a fluid-tight seal, the outer surfaces of the crests 16 and the inner periphery of the bore 19 are lapped. The outer convolutions 14 define a plurality of annular parallel spaced labyrinth spaces 28 next to the inner periphery of the bore 19 which may be filled with a suitable lubricant, such as a mixture of graphite and grease. In the present instance, the bushing 21 and the spring 24 are eliminated. However, a plurality of annular split springs 29 are disposed inside the outer convolution 14 for the purpose of reinforcing the resilient expansive tendency of the bellows.

In the form of the invention illustrated in Fig. 5, the bellows instead of comprising a corrugated cylinder, comprises a plurality of annular units, each of which is U-shaped in construction, having an inner trough 30 and diverging sides 31. The outer peripheral edges of the contiguous sides of the units are tightly secured together in any suitable manner. The bellows is secured at its outer end to the bushing 21, and the spaced inner peripheral surfaces of the troughs 30 are lapped and contact with the lapped surface of the shaft 10 to effect a fluid-tight seal.

In the form of the invention illustrated in Fig. 6, the bellows 13 is of the same type as in Fig. 1, but has a peripheral bearing contact with the shaft 10 and the peripheral surface of the bore 19. The ends of the bellows are free, and the coacting surfaces of the parts are lapped. No springs 24 is provided, and lubricant may be placed in the spaces 25 and 28. A plurality of oil rings 32 are loosely mounted on the shaft 10 within the V-shaped labyrinth spaces 25.

In the form of the invention illustrated in Figs. 7 and 8, the ends of the crests 16 and the troughs 17 are flattened so as to provide more extensive contacts with the shaft 10 and the peripheral surface of the bore 19. Preferably, the sides 18 are straight. The shaft 10 is formed with a tapped portion 33 on which a suitable nut 34 is adjustably mounted. This nut is formed on one end with an annular expanding wedge 35 which closely embraces and is rotatable with the shaft 10 and which projects into the outer end of the bellows 13. It will be evident that adjustment of the nut 34 will serve to adjust the bellows. The nut 34 confines the bellows to the bore 19, and hence no bushing 21 is provided.

In the form of the invention illustrated in Fig. 9, the sides of the convolutions of the bellows converge. In this form, elongation of the bellows initially results in a decrease in the internal diameter and an increase in the external diameter. No springs are provided, and the inherent resiliency of the bellows is relied upon to maintain a good fluid-tight contact. In other respects, the construction is the same as in Fig. 1.

It will be evident that I have provided a novel and highly advantageous packing which will provide a permanent fluid-tight seal, which is self-adjustable to compensate for irregularities in the coacting surfaces and for wear, which will not wear to an objectionable extent over a long period of time, which is simple and inexpensive in construction, and which in any one size will fit differently sized parts.

If desired, the sealing surfaces need not be lapped before assembly, but a soluble lapping compound can be incorporated in the lubricant. This compound will lap the surfaces in a short time and then dissolve in the lubricant.

I claim as my invention:

1. A fluid-tight packing comprising, in combination with a rotary shaft and a bearing for said shaft, a flexible resilient bellows disposed about said shaft and having a peripheral surface in bearing contact therewith, said bellows having a fixed fluid-tight connection with said bearing.

2. A fluid-tight packing comprising, in combination with a rotary shaft and a bearing for said shaft, a bore formed in said bearing about a portion of said shaft, a bushing closing the outer end of said bore, and a corrugated cylindrical bellows disposed in said bore and having inner peripheral contact with said shaft, the outer end of said bellows having a rigid fluid-tight connection with said bushing, the inner end of said bellows being free for longitudinal movement, and a spring disposed in said bore between the inner end thereof and said bellows and tending to contract said bellows to maintain said contact.

3. A fluid-tight packing comprising, in combination with a rotary shaft, means defining a bore about a portion of said shaft, and a bellows disposed in said bore, said bellows comprising a plurality of longitudinally spaced peripheral convolutions with converging sides, the inner convolutions having bearing contact with said shaft, and one end of said bellows having a fluid-tight connection with said means.

4. A fluid-tight packing comprising, in combination with a rotary shaft and a bearing for said shaft, a resilient corrugated cylindrical member encircling and bearing on said shaft and defining a plurality of sealed labyrinth spaces along said shaft, said member having a fluid-tight connection with said bearing.

5. A fluid-tight packing comprising, in combination with a rotary shaft and a bearing for said shaft, a resilient corrugated cylindrical member encircling and bearing on said shaft and defining a plurality of sealed labyrinth spaces along said shaft, said member having a fluid-tight connection with said bearing, and lubricating means in said spaces.

6. A fluid-tight packing comprising, in combination with a rotary shaft and a bearing for said shaft, a flexible diaphragm having an annular convolution in peripheral bearing engagement with said shaft, one end of said diaphragm having a fixed fluid-tight connection with said bearing, and spring means engaging the other end of said diaphragm and tending to contract said diaphragm.

7. A fluid-tight packing comprising, in combination with two concentric relatively movable parts, a flexible bellows comprising a plurality of longitudinally spaced peripheral convolutions interposed between said parts, said convolutions being in peripheral bearing engagement with one of said parts, and said bellows having a fixed fluid-tight connection with the other of said parts.

8. A fluid-tight packing comprising, in combination with two concentric relatively movable parts, a flexible bellows comprising a plurality of longitudinally spaced peripheral convolutions interposed between said parts, said convolutions being in peripheral bearing engagement with the inner part and having a fixed fluid-tight connection with the outer part.

9. A fluid-tight packing comprising, in combination with two concentric relatively movable parts, a flexible bellows comprising a plurality of longitudinally spaced peripheral convolutions interposed between said parts, said convolutions being in peripheral bearing engagement with one of said parts, said bellows having a fixed fluid-tight connection with the other of said parts, and spring means acting on said bellows to flex the latter endwise to maintain said bearing engagement.

10. A fluid-tight packing comprising, in combination with two concentric relatively movable parts, a flexible bellows comprising a plurality of longitudinally spaced peripheral convolutions interposed between said parts, said convolutions being in peripheral bearing engagement with one of said parts, said bellows having a fixed fluid-tight connection with the other of said parts, and a lubricant in the spaces defined by said convolutions with said one part.

In testimony whereof, I have hereunto affixed my signature.

FRANK E. WILSEY.